(12) United States Patent
Shamir (10) Patent No.: US 8,291,221 B2
(45) Date of Patent: Oct. 16, 2012

(54) METHOD AND APPARATUS FOR IMPLEMENTING A NOVEL ONE-WAY HASH FUNCTION ON HIGHLY CONSTRAINED DEVICES SUCH AS RFID TAGS

(75) Inventor: Adi Shamir, Rehovot (IL)

(73) Assignee: Yeda Research & Development Co. Ltd., Rehovot (IL)

( * ) Notice: Subject to any disclaimer, the term of this patent is extended or adjusted under 35 U.S.C. 154(b) by 453 days.

(21) Appl. No.: 12/672,771

(22) PCT Filed: Aug. 8, 2008

(86) PCT No.: PCT/US2008/072586
§ 371 (c)(1),
(2), (4) Date: Feb. 9, 2010

(87) PCT Pub. No.: WO2009/023550
PCT Pub. Date: Feb. 19, 2009

(65) Prior Publication Data
US 2011/0271105 A1    Nov. 3, 2011

(30) Foreign Application Priority Data
Aug. 14, 2007 (IL) .......................... 185285

(51) Int. Cl.
*H04W 12/06* (2009.01)
*H04L 9/28* (2006.01)
(52) U.S. Cl. .......................... 713/168; 380/1

(58) Field of Classification Search ............ 713/168
See application file for complete search history.

(56) References Cited

U.S. PATENT DOCUMENTS

| | | | | |
|---|---|---|---|---|
| 5,299,263 A * | 3/1994 | Beller et al. | | 380/30 |
| 6,259,790 B1 * | 7/2001 | Takagi et al. | | 380/30 |
| 6,298,136 B1 * | 10/2001 | Den Boer | | 380/29 |
| 2001/0053220 A1 * | 12/2001 | Kocher et al. | | 380/29 |
| 2002/0114451 A1 * | 8/2002 | Satterfield | | 380/37 |
| 2003/0044004 A1 | 3/2003 | Blakley et al. | | |
| 2003/0202657 A1 * | 10/2003 | She | | 380/30 |
| 2006/0112264 A1 * | 5/2006 | Agarwal | | 713/150 |
| 2007/0164863 A1 | 7/2007 | Himberger et al. | | |

OTHER PUBLICATIONS

QUAD: Berbain et al., "A Practial Stream Cipher with Provable Security", 2006, pp. 1-20.*
International Search Report, published Feb. 19, 2009, for PCT/US2008/072586, filed Aug. 8, 2008.
International Preliminary Report on Patentability, published Feb. 16, 2010 for PCT/US2008/072586, filed Aug. 8, 2008.
Written Opinion, published Feb. 14, 2010 for PCT/US2008/072586, filed Aug. 8, 2008.

* cited by examiner

*Primary Examiner* — Ashok Patel
*Assistant Examiner* — Andrew Goldberg
(74) *Attorney, Agent, or Firm* — Martin Fleit; Paul D. Bianco; Fleit Gibbons Gutman Bongini & Bianco PL (57) ABSTRACT

A method and apparatus for implementing a novel one-way hash function with provable security properties for authentication and non-authentication applications on highly constrained devices, with particular application to RFID tags.

17 Claims, 5 Drawing Sheets

Fig. 1

INITIALIZATION OF THE NONLINEAR FEEDBACK SHIFT REGISTER

| $S_1 \oplus R_1$ | $S_2 \oplus R_2$ | . . . | $S_{63} \oplus R_{63}$ | $S_{64} \oplus R_{64}$ |

GENERATION OF THE k=1277 BITS OF m IN THE FORWARD DIRECTION:

GENERATION OF THE k=1277 BITS OF m IN THE BACKWARD DIRECTION:

METHOD AND APPARATUS FOR IMPLEMENTING A NOVEL ONE-WAY HASH FUNCTION ON HIGHLY CONSTRAINED DEVICES SUCH AS RFID TAGS

BACKGROUND OF THE INVENTION

1. Field of the Invention

The present invention relates to a method and apparatus for implementing or executing or running security protocols or programs or functionality that require or use or rely upon one-way hash functions on constrained devices with very little processing power and memory, and more particularly to a method and apparatus that utilizes a novel one way hash function, called SQUASH, which has provable security properties in a challenge-response authentication protocol that can be implemented even on highly constrained devices such as RFID tags.

2. Prior Art

There are many known protocols for a computational device with processing element and memory which require the implementation of a one-way hash function on that device in order to protect the secrecy of some information. In particular, one-way hash functions are designed to protect the secret input of a computation even when an adversary can observe the output of this computation, e.g., if this output is sent out as part of the protocol and can be eavesdropped to by the adversary. One of the most common protocols using this security requirement concerns challenge-response authentication for a device in some system. The device can be an RFID tag, a smart card, a hand held device, a PC, or any other computational device with processing element and memory.

Passive RFID tags are very simple computational devices (costing a few cents each). They obtain their power from and communicate with a reader using a magnetic or electromagnetic field at a distance of several centimeters to several meters. They have many applications, including warehouse inventory control, supermarket checkout counters, public transportation passes, anti-counterfeiting tags for medicines, pet identification, secure passports, etc. They are already widely deployed, and many more applications are likely to be found in the near future.

The basic requirement in most of these applications is that a tag should be able to interactively authenticate itself securely to a reader. It is assumed that the tag contains some nonsecret identity I and some secret information S associated with it. When challenged by the reader, the tag sends I in the clear, and convinces the reader that it knows S, without enabling rogue readers or passive eavesdroppers to extract S or to convince another reader that they know S, when in fact they do not.

The classical solution for such a problem is to use zero knowledge interactive proofs, which prevent any leakage of information about S. However, such proofs are too complicated for RFID tags which have tiny memories and very limited computing power. In addition, in many applications the legitimate reader already knows the secret S, and thus one does not care about the potential leakage of information from the real prover to the real verifier. Thus, a much simpler protocol can be used, which is known in the art as challenge-response authentication, in which the reader issues a random challenge R, and the tag responds with the value H(S,R) where H is some publicly known hash function. This value is independently computed by the reader, which accepts the authentication, if and only if the computed and received values are the same.

The main requirement from H is that it should protect the secrecy of the secret S even after an eavesdropper or a rogue reader gets $H(S,R_i)$ for many (known or chosen) challenges $R_i$, and in particular it should make it difficult for the adversary to compute the correct response of the tag to a new random challenge which had not been seen before. The function H should thus be one way, hiding all information about S, but not necessarily collision resistant since this is not a security threat in challenge-response applications.

Unfortunately, standard hash functions (such as SHA-1) are primarily designed to be collision resistant in order to prevent forgery of digitally signed documents. This is a very difficult requirement, which adds a lot of unnecessary complexity to the design, and makes its use too complicated for RFID tags. This was recognized by the RFID research community, and over the last few years there has been a major effort to develop dedicated one way hash functions which are not necessarily collision resistant, and which are more suitable for RFID applications.

The best known schemes of this type belong to the HB family of schemes originally proposed by Hopper and Blum in 2001, which now includes the schemes HB, HB+, HB++, HB#, trusted-HB and HB-MP. The security of these schemes is based on the difficulty of solving the parity with noise problem, which is known to be NP-complete in general. These schemes are much simpler than SHA-1, but they suffer from several serious problems:

1. The tag needs an internal source of random bits. Real randomness is difficult to find and can be externally manipulated by an adversary, while pseudo-randomness requires a large nonvolatile memory and lots of computations.
2. Since the proof of authenticity in these schemes is probabilistic, there is a small chance that a tag will fail to convince a reader that it is valid even when both of them are honest and there are no adversaries.
3. There are several parameters involved (the length of the secret, the number of repetitions, the probability of the additive noise, etc) and there is considerable debate about which values of these parameters will make the scheme sufficiently secure.
4. Over the last few years, a large number of attacks were developed against these schemes, and the various members of the HB family were developed in response to these attacks. For example, HB is known to be insecure against active adversaries. HB+ was claimed to be secure against such adversaries, but it had been recently shown that it can be attacked by a man-in-the-middle adversary who can modify the challenges and observe the reaction of the real reader to the modified responses. With each modification, the scheme became more complicated, requiring larger keys and more computations, and it is not clear that even the latest version is completely secure.

SUMMARY OF THE INVENTION

Accordingly the present invention has been developed to provide a method and apparatus for implementing or executing or running security protocols or programs or functionality that require or use or rely upon one-way hash functions on constrained devices with very little processing power and memory, and more particularly to a method and apparatus that utilizes a novel one way hash function, called SQUASH, which has provable security properties in a challenge-response authentication protocol that can be implemented even on highly constrained devices such as RFID tags.

Further, the present invention has been developed to provide a method and apparatus for implementing a novel one-way hash function called SQUASH (which is short for SQUare-hASH) on highly constrained devices, which can be used both for authentication and non-authentication purposes, and more particularly to a method and apparatus that utilizes a simple one way hash function with provable security properties that can be implemented on RFID tags.

This is accomplished through a method and apparatus for a communication system through the use of a novel hash function, which is particularly suited to RFID-based challenge-response authentication. Unlike the HB schemes it is completely deterministic, and thus it does not need any source of randomness and there is no way in which a legitimate tag will fail to convince a legitimate reader that it is authentic. It is exceptionally simple, and yet it is provably at least as secure as the Rabin public key scheme which had been extensively studied over the last 30 years.

The basic idea of the novel hash function is to mimic the operation of the Rabin encryption scheme in a unique manner. According to the Rabin encryption scheme, a message m is encrypted under key n (where the publicly known modulus n is the product of at least two unknown prime factors) by computing the ciphertext $c=m^2$ (mod n). This is an excellent one way function, but definitely not collision resistant, since m and −m always hash to the same c. To make the Rabin scheme secure, the length k of n must be at least 1000 bits long, the length of m should not be much smaller than k, and thus just to store n, m and c one would need at least 3000 bits. Clearly a general modular squaring operation can not be performed on a severely limited RFID tag which can store less than 300 bits.

In the secure authentication application, the full size message m is computed from the short secret S (which is typically 64 bits long) and the short challenge R (which is also typically 64 bits long) by some simple mixing and extending procedure m=M(S,R). A typical example of such a function M is to XOR S and R, and use the result as a seed of some feedback shift register (FSR) to generate k=|n| bits. The FSR should preferably be nonlinear and invertible. Alternative approaches are to add or concatenate S and R instead of XOR'ing them, or to use a Feistel structure instead of FSR, or to feed successive chunks of S and R into a pseudo random generator instead of using them to seed it, or to use any other technique known in the art. The real security in this scheme is provided by the modular squaring operation, and the function M should only prevent some obvious attacks (e.g., to prevent the easy extraction of non-modular square roots when m is too short, and to prevent the extraction of S by the solution of systems of equations when m is algebraically defined by S and R). In addition, a good function M can destroy the potentially dangerous multiplicative property of modular squaring. No particular mixing function M is recommended herein, and M is only assumed to be secure when combined with the full Rabin encryption scheme in the sense that no useful information about the secret S can be obtained by analyzing the ciphertexts $c=M(S,R)^2$ (mod n) produced from a polynomial number of known or chosen challenges R.

It was proposed in the prior art to simplify the implementation of modular squaring on constrained devices by replacing the modular squaring operation $m^2$ (mod n) by a randomized squaring operation $m^2+rn$ where r is a random number which is at least 100 bits longer than n. This scheme is provably as strong as the original Rabin scheme, and has the additional advantage that it can be computed with a very small memory since the successive bits of $m^2$ and rn can be computed on the fly from LSB to MSB. This scheme can be used in low end smart cards, but it requires a lot of time and power to compute all the bits of the output (which is twice as long as in the original Rabin scheme), and is not suitable for the weaker processors contained in RFID tag.

The present invention for a method and apparatus for implementing one-way hash functions on highly constrained devices, and more particularly to a method and apparatus that utilizes a simple one way hash function with provable security properties that can be implemented on highly constrained devices, such as RFID tags, is accomplished by a novel modification of the Rabin encryption scheme to obtain a novel and unique hash function without losing its well-studied security properties. The first observation and advantage of the present invention is that in the challenge-response application, no one has to invert the mapping in order to recover the plaintext from the ciphertext, since both the tag and the reader compute the novel hash function only in the forward direction. Since one does not need a trapdoor in this application, no participant in the protocol needs to know the factorization of n, and thus everyone can use the same universal modulus n as long as no one knows how to factor it.

The second observation and advantage of the present invention is that if this universal n can be compactly represented by a small number of bits, a lot of storage on the RFID tag can be saved. In particular, the invention utilizes a composite Mersenne number of the form $n=2^k-1$, which can be stored very compactly since its binary representation is just a sequence of k 1's. Other recommended choices of n which have very compact representations, such as numbers of the form $n=a*(b^c)\pm d$ for small values of a, b, c, and d, will be discussed subsequently.

A lot of effort was devoted over the last decade to determine which Mersenne numbers are prime, and to factorize those Mersenne numbers which are composite. A table summarizing the current status of these efforts can be found in the literature, and the most recent success in factorizing such numbers was the complete factorization of $2^{1039}-1$ in 2007 by a large distributed computation. Since such numbers are a little easier to factor (by the special number field sieve) than general numbers (which require the general number field sieve), the invention preferably uses numbers with k>1200. In particular, it is recommended using $n=2^{1277}-1$, which is generally a 350 digit number and more precisely a 385 digit number that is known to be composite, but none of its factors is known. Other recommended values are the slightly smaller $n=2^{1237}-1$ or even the marginally secure $n=2^{1061}-1$. As will be discussed later, the method and apparatus of the invention can also use the novel hash function securely with Mersenne numbers which have some small known factors. It is important to note that an essential novel point of the present invention is that the provable security properties of the Rabin scheme (such as the computational equivalence of decryption and factoring or the bit security of the plaintext) apply to any modulus n, including the special case of Mersenne composites, and it is strongly believed that one cannot recover useful information about a random message m from its ciphertext $c=m^2$ (mod n) even if the modulus n is a Mersenne number as long as it has an unknown factorization.

The third observation and advantage of the present invention is that Mersenne moduli are not only easy to store, but they also make the computation of $m^2$ (mod $n=2^k-1$) particularly simple: Since $2^k=1$ (mod n), one just computes the double sized $m^2$, and then numerically add the top half to the bottom half. More precisely, if $m^2=m1*2^k+m2$, then $m^2=m1+m2$ (mod n).

The fourth observation and advantage of the present invention is that there is no need to send the full 1000+ bit ciphertext c in response to the challenge R. In general, when no information about the expected response c can be computed by the adversary, the probability that the reader will accept a random t-bit answer from an adversary is $2^{\{-t\}}$. In most cases, a sufficiently secure authentication of an RFID tag will be achieved if it sends t=32 bits (with a cheating probability of about one in 4 billion). Low security applications can even use t=16 and high security applications can either use a larger t such as 64, or repeat a low security authentication procedure several times with different challenges. The tag can thus send only a small subset of the bits of c, and as will be described shortly, sending a window of t consecutive bits from c makes the tag's computation particularly simple. This window can be set almost anywhere within c, but it is recommended using a window which is close to its center. It is important to note that the difficulty of computing some useful predicate of the secret S (such as computing one of the bits of its expected response to some new challenge R') is monotonically decreasing with t since any computational task can only become easier when more information is provided in the input. In particular, if it is assumed that it was difficult in the original Rabin scheme, then it will certainly be difficult when only t out of the k bits from each Rabin ciphertext are made available by the tag to the adversary in each response.

The fifth observation and advantage of the present invention is that if one wants to be sure that a particular bit computed in $m^2$ is correct, one has to compute in the worst case all the earlier bits in order to be certain about the effect of the carry entering this bit position (addition carries propagate only from LSB to MSB, so one does not have to compute higher order bits in $m^2$). However, it is possible to get an excellent numeric approximation of the carry into the t bits that one would actually like to compute, if a longer window of t+u bits with u additional low order bits is computed, assuming that no carry entered into the LSB of this extended window, and providing only the top t out of the t+u bits as an answer. For k between 1024 and 2048, it is easy to show that the carry into each bit position in the computation of $m^2$ can be at most 11 bits long, and thus if one adds u=16 low order bits to the computed window, one has only a small probability of less than 1/32 of computing an incorrect carry into the 16-th bit computed. If one adds u=64 low order bits, then this error probability becomes negligible. Note that from the invention, it can even be known when a mistake is possible (a necessary condition is that all the u−11 bits above the 11 LSB bits in the extended window are 1 so that the unknown carry can propagate through them), and thus one can always start the computation with a small u such as 16, and only in the small fraction of the cases in which the u−11 bits computed are 1, one can rerun the computation with a larger u such as 32 or 64. This can guarantee an extremely small error probability and an average running time which is only slightly higher than always computing t+16 bits.

With this relaxation, what is gained is the ability to compute the relevant bits in $m^2$ one to two orders of magnitude faster than a full computation of $m^2$. What is lost is that the value produced is only an approximation of the real value produced by Rabin's encryption scheme, and thus it is conceivable that by using the method of the present invention more information will be revealed about the secret S than by using Rabin's scheme. However, the two results differ only in a negligible fraction of executions, and thus neither the reader nor the adversary is ever expected to see an incorrectly computed answer, and thus the formal security proof (based on the assumption that the Rabin scheme is secure) remains unaffected.

The sixth observation and advantage of the present invention is that if the bits of m can be generated by a reversible feedback shift register FSR, one can compute bit j in $m^2$ without storing the long m explicitly, by convolving two streams of successive bits of m which are generated in the forward and backward directions in two independent FSR's. When one wants to compute bit j in the lower half of $m^2$, it is computed by summing all the products $m_v * m_{\{j-v\}}$ for v=0, 1, 2, ..., j, and add to this sum the carry from the computation of the previous bit. When one wants to compute bit j+k in the upper half of $m^2$, it is computed by summing all the products $m_v * m_{\{j+k-v\}}$ for v=j+1, ..., k−1, and add to this sum the carry from the computation of the previous bit. When one wants to compute $m^2$ (mod n) for n=$2^k$−1, the upper half and lower half of $m^2$ is summed, and thus the j-th bit $c_j$ of c=$m^2$ (mod n) can be computed by adding bits j and j+k in $m^2$, along with their carries. It is easy to verify that the sum of the two linear convolutions defining bits j and j+k is exactly the circular convolution defined as the sum of all the products $m_v * m_{\{j-v(\mod k)\}}$ for v=0, 1, 2, ..., k−1. The final algorithm is thus extremely simple:

1. In response to a challenge, start with j which is the index at lower end of the desired extended window, and set carry to 0.
2. Numerically add to the current carry (over the integers, not modulo 2) the k products of the form $m_v * m_{\{j-v(\mod k)\}}$ for v=0, 1, 2, ..., k−1.
3. Define bit $c_j$ as the least significant bit of the carry, set the new carry to the current carry right-shifted by one bit position, and increment j by one.
4. Repeat steps 2 and 3 t+u times, throw away the first u bits, and provide the last t bits as the response to the challenge.

BRIEF DESCRIPTION OF THE DRAWINGS

Other and further advantages of the present invention will become readily apparent from the description of the invention given below when taken in conjunction with the appended drawings in which.

DETAILED DESCRIPTION OF PREFERRED EMBODIMENTS OF THE PRESENT INVENTION

Figure 1:
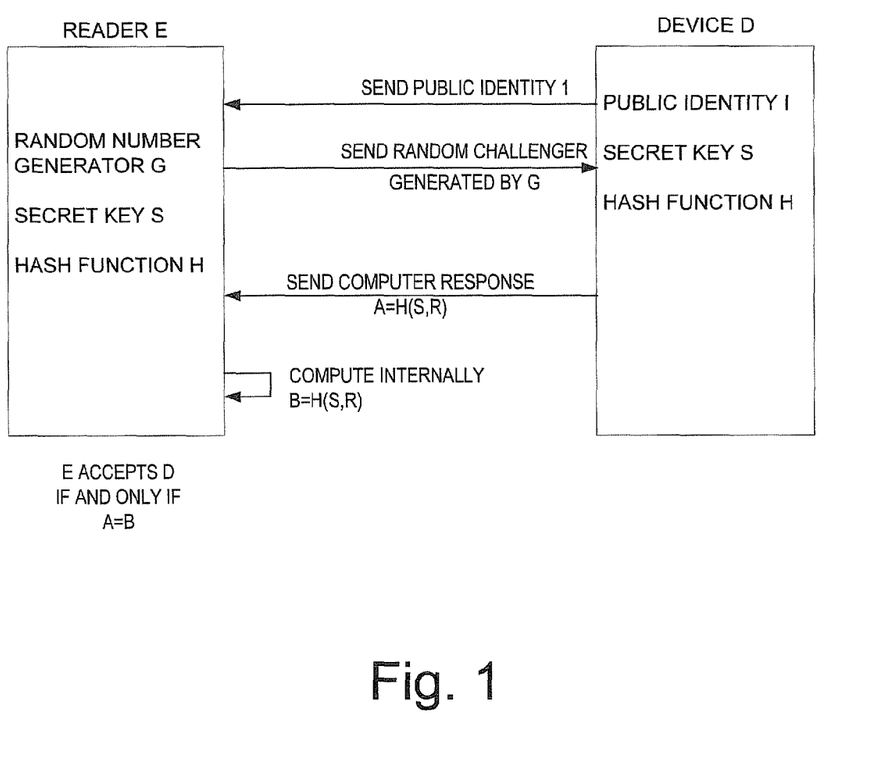
FIG. 1 shows schematically and in block diagram a standard challenge-response authentication protocol for devices such as RFID tags.

FIG. 1 shows schematically and in block diagram a standard challenge-response authentication protocol for devices such as RFID tags. As shown in FIG. 1, is a reader E communicating with a device D. The reader E contains a random number generator G, a secret key S and a hash function H. The device D contains a public identity I, the secret key S and hash function H. In the communication exchange, the reader E sends to the device D a random challenge R generated by random number generator G. The device D sends to the reader E its public identity I, and sends to reader E a computed response A=H(S,R). Reader E computes internally B=H(S, R). Reader E accepts device D if and only if A=B.

Figure 2:
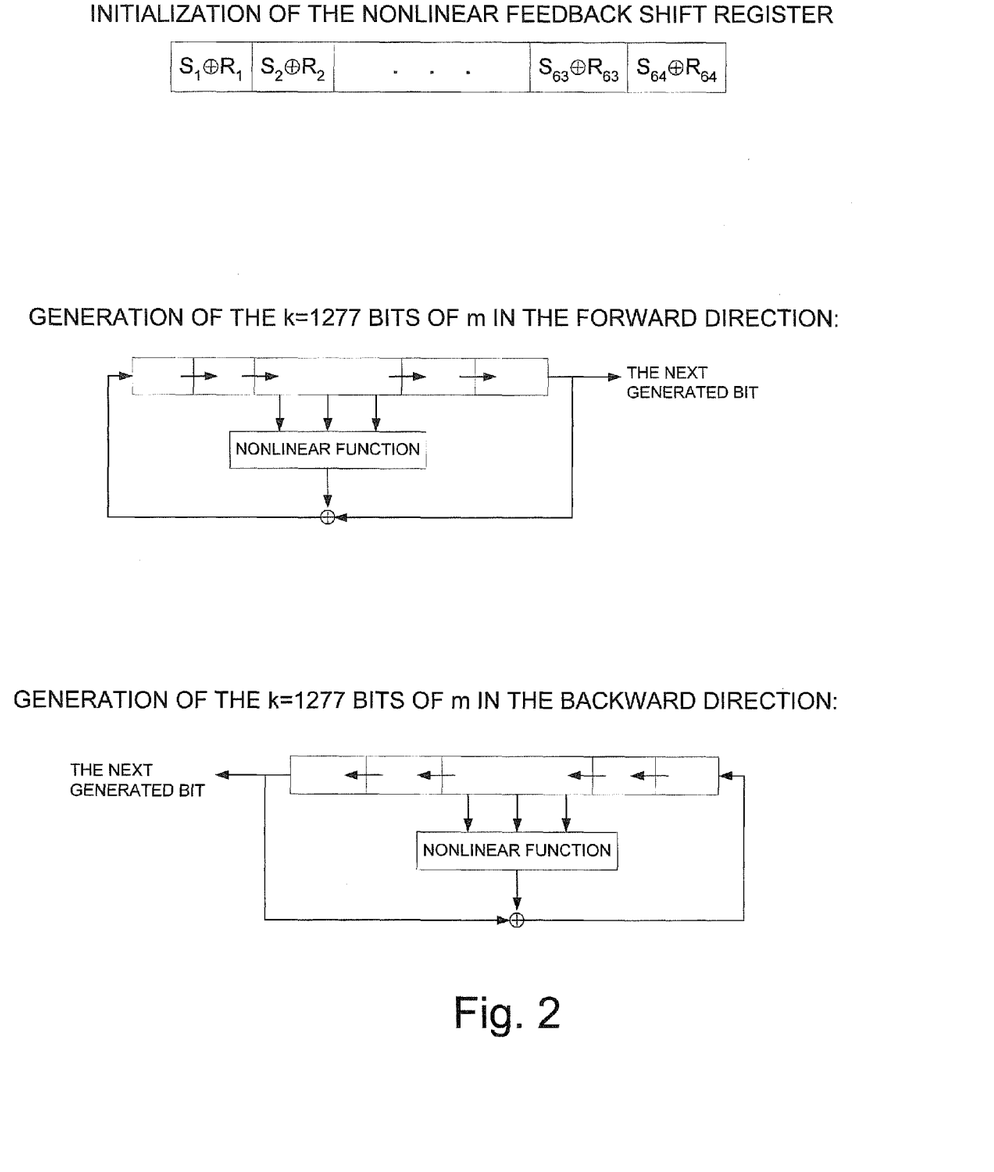
FIG. 2 shows schematically the method and apparatus of the present invention as implemented by Feedback Shift Registers (FSR)
Figure 4:
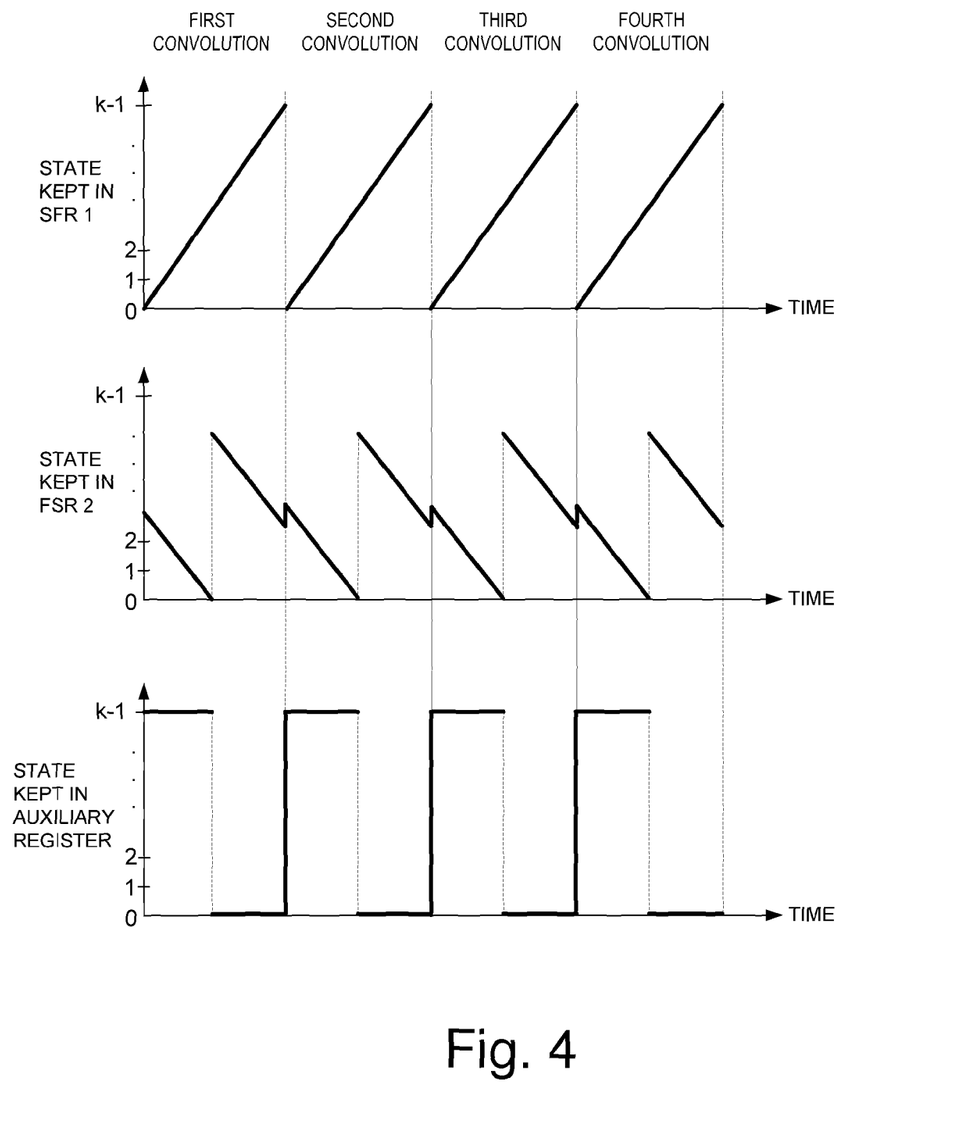
FIG. 4 shows graphically the method and apparatus of the present invention as an optimized implementation of the convolutions within two FSRs and one auxiliary register, in which the auxiliary register exchanges its own value with the FSRs' values at various times to enable the two FSR's to perform instantaneous modular jumps to far away states.
Figure 5:
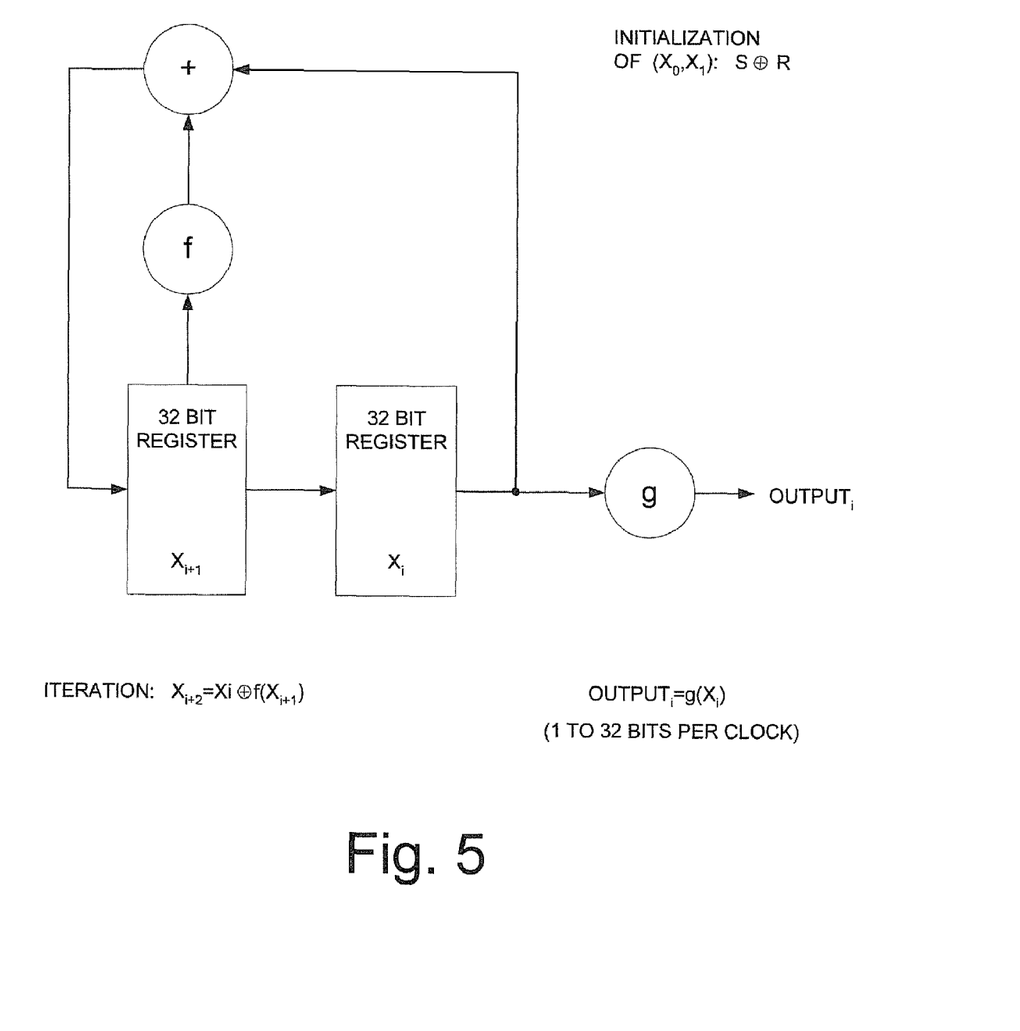
FIG. 5 shows schematically the method and apparatus of the present invention employing a Feistel structure as a FSR with two half size words which can be iterated forwards and backwards.

The most compact implementation of the method and apparatus of the present invention is to use a single feedback shift register FSR in order to generate all the required bits by running it forwards and backwards as necessary, as described and as shown in FIG. 2. However, this requires quadratic amount of time in the length k of n. A slightly larger but much faster implementation is to use two feedback shift registers which move over states in opposite directions. The problem with this implementation is that in order to perform a modular jump to the opposite state each register has to perform k shifts, and thus the total running time is twice the number of bit products, i.e., 2k(t+u). If the RFID can contain a third 64 bit register (which does not have to shift), the running time can be halved to k(t+u) by alternately storing in the auxiliary register the far away states 0 and k−1, and exchanging them with the two FSR's at the right points in time as described and as is shown in FIG. 4. Note that two registers Y and Z can exchange their values without using any additional storage by performing the three consecutive steps: Y=Y XOR Z, Z=Y XOR Z, Y=Y XOR Z. FIG. 5 illustrates an alternative implementation which generates multiple bits of m in each clock cycle by using a standard Feistel structure with a nonlinear feedback function f and a linear or nonlinear output function g. Such a Feistel structure can be viewed as a two stage feedback shift register where each stage contains half the state. This can reduce the number of clock cycles needed to implement the hash function, but makes the mixing of the state bits less thorough.

Referring to FIG. 2, there is shown one of the recommended implementations of the algorithm of the present invention for computing m=MIX(S,R). In the implementation shown, a nonlinear Feedback Shift Register is used. As shown in FIG. 2, a nonlinear feedback shift register 20 is used initialized as shown in the top portion of the figure with the cells loaded with $S_1 \oplus R_1$; $S_2 \oplus R_2$; ... $S_{63} \oplus R_{63}$; $S_{64} \oplus R_{64}$.

The generation of the k=1277 bits of m in the forward direction is shown in the middle portion of the figure wherein the nonlinear function generates the next bit, as shown to the right of the figure. For the generation of the k=1227 bits of m in the backward direction, that is shown in the bottom portion of the figure with the nonlinear function generating the next generated bit shown to the left of the figure.

Figure 3:
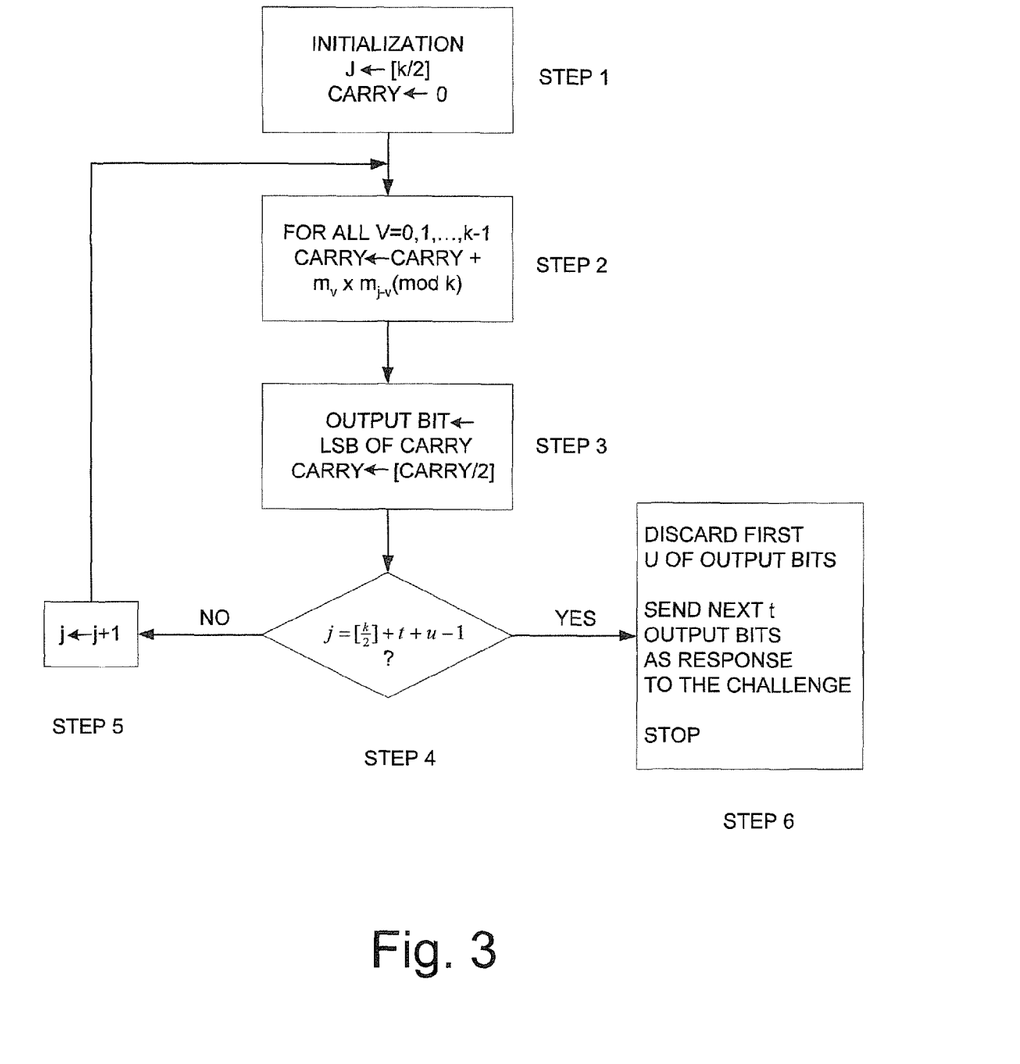
FIG. 3 shows via a flow diagram the method and apparatus of the present invention in an implementation of the novel hash function H for n=$2^k$−1.

The recommended implementation of the hash function H for $n=2^k-1$ is shown in FIG. 3. The program is shown in flow chart form. Initialization is conducted in Step 1 for j←[k/2] for carry←0. Thereafter in Step 2 is calculated for all v=0, 1 ... k−1, carry←carry+$m_v \times m_{\{j-v(mod\,k)\}}$. The output of Step 2 is sent to Step 3 wherein is calculated output bit←LSB of carry, carry←[carry/2]. The output of Step 3 is sent to Step 4 wherein a decision is taken regarding j=[k/2]+t+u−1 (?). If NO, then in Step 5 j←j+1 and the program loops back to Step 2. If YES, then the program proceeds to Step 6 wherein the first u of the output bits are discarded and the next t bits are sent as response to the challenge, and thereafter, the program stops.

Referring now to FIG. 4, there is shown graphically the method and apparatus of the present invention as an optimized back and forth implementation of the convolutions within two FSRs, denoted FSR1 and FSR2, and one auxiliary register, as described above. Initially the first FSR1 is set to the first state 0, the second FSR2 to some middle state j, and the auxiliary register to the last state k−1. The first FSR1 is run upwards all the way from state 0 to state k−1, and the second FSR2 downwards from state j. When it reaches state 0, its state is exchanged with the auxiliary register, so that now the second FSR2 will contain state k−1 and the auxiliary register will contain state 0. Then the second FSR2 continues to run downwards from state k−1 to state j+1. This completes the computation of the first $c_j$, and brings the three registers into an almost ideal position for computing the next bit: Instead of reloading them with recomputed states, the final states of the first FSR1 and the auxiliary register are exchanged, and the second FSR2 is clocked once to increment its state from j+1 to j+2. Then the next bit $c_{\{j+1\}}$ can be computed by running the convolution again in the same direction. Due to the associativity of addition, the sum of products can be computed either upwards or downwards and get the same value, and thus it is also possible to have an implementation in which the first FSR1 alternately runs forwards and backwards through states 0, 1, ... , k−1, the second FSR2 alternately runs backwards and forwards in a cyclic order (mod k), incrementing its state once after each round, and the auxiliary register alternately keeps states k−1 and 0 in order to help only the second FSR2 jump between these cyclically adjacent extreme states.

Referring to FIG. 5 there is shown schematically an example of a Feistel structure as a FSR with two half size words which can be iterated forwards and backwards. As shown, there are two 32 bit registers, one on the left containing $X_{i-1}$ and the other on the right containing $X_i$. The left register output is connected to the right register. The right register has an output that goes to a linear or nonlinear output function g, the output of which is $output_i$. The output of the left register goes to a nonlinear feedback function f and then as one input to an XOR ($\oplus$) device. The other input to the device is taken from the right register output. The output of the device is fed back to the left register. The initialization of $(X_0, X_i)$: $S \oplus R$.

Thus, FIG. 5 illustrates an alternative implementation which generates multiple bits of m in each clock cycle by using a standard Feistel structure with a nonlinear feedback function f and a linear or nonlinear output function g. Such a Feistel structure can be viewed as a two stage feedback shift register where each stage contains half the state. This can reduce the number of clock cycles needed to implement the hash function, but makes the mixing of the state bits less thorough.

An important comment is that if the processor can multiply b-bit values in a single instruction, it can compute the same type of circular convolution b times faster by working with words rather than bits. Future RFID tags might contain simple 4-bit multipliers, which will speed up this algorithm by a factor of 4. In addition, the powerful readers (which also have to carry out this computation to compare the expected and received responses) are likely to have 32-bit microprocessors with 32-bit multipliers, making this algorithm extremely fast.

So far computing the novel hash function when the underlying modulus is a composite Mersenne number of the form $2^k-1$ has been described. It is very easy to modify the scheme to composite numbers of the form $2^k+1$. The Rabin ciphertext in this case is defined by subtracting (instead of adding) the top half of $m^2$ from the bottom half. Consequently, when computing the circular convolution one has to add to the carry all the products of the form $m_v * m_{\{j-v\}}$ for v=0, 1, 2, ... , j, and to subtract from the carry all the other products of the form $m_v*m_{\{j+k-v\}}$ for $v=j+1, \ldots, k-1$. Except for this minor change, everything else remains the same.

Also a more complicated moduli can be used, such as $n=a*2^k-d$ where a and d are small positive integers. Since $a*2^k$ is congruent to d, one has to add to the bottom half of $m^2$ the top half divided by a and multiplied by d. To avoid the complicated division operation, the definition of the output computed can be changed to be a window of t consecutive bits in $a*m^2$ (mod n). Note that the security of Rabin's encryption scheme cannot be changed if all its ciphertexts are multiplied by a known constant a, and thus security is not lost by computing windows of bits in such modified Rabin ciphertexts instead of in the original ciphertexts. Since a multiplies both the top and the bottom parts of $m^2$, this implies that the algorithm now has to add to the carry all the products of the form $a*m_v*m_{\{j-v\}}$ for $v=0, 1, 2, \ldots, j$, and then to add to the carry all the other products of the form $d*m_v*m_{\{j+k-v\}}$ for $v=j+1, \ldots, k-1$. If n is of the form $a*2^n+d$, then the algorithm has to subtract (rather than add) from the carry all the products of the second type. When n is of the general form $a*b^c \pm d$ for small a, b, c and d, the algorithm can perform the same type of computations in base b instead of base 2, but this will probably make the scheme too complicated for a typical RFID.

Another observation and advantage of the present invention is that one can retain the formal proof of security even if n has some small known factors, provided that it has at least two large unknown factors. This can greatly extend the set of moduli which can be used, since most of the composite Mersenne numbers for 1000<k<2000 have some small known factors. Consider, for example, the case of $n=2^{1213}-1$, which has a known prime factor of 327511 and a composite cofactor of 360 decimal digits whose factorization is completely unknown. If the Rabin's encryption scheme is used with this n, the value of the ciphertexts modulo 327511 actually leaks the values of the plaintexts modulo the same number. The invention can completely stop this leakage of information by adding to each Rabin ciphertext a freshly selected random number between 0 and 327510, which randomizes the value of the ciphertexts modulo 327511. The crucial observation is that since these changes are small and a window of bits near the middle of each Rabin ciphertext is computed, it can be pretended that such a randomizing value was indeed added to the ciphertext without changing anything in the inventive method and algorithm—the only effect of the randomization is that the numerical approximation of the middle windows in the Rabin ciphertexts will deteriorate in a negligible way.

The final observation and advantage of the present invention is that many parameter choices were made in order to show that the unique hash function is at least as secure as the equivalent Rabin encryption scheme. However, the converse implication is not necessarily true. Consider, for example, the choice of $n=2^{1277}-1$ as the recommended universal modulus. Assume that next year someone will find the complete factorization of this number. This will devastate the security of the Rabin scheme which uses this modulus. It will also eliminate the formal proof of security of the present scheme, but will not necessarily make it insecure in practice: Even if one can extract modular square roots mod n, it may be extremely difficult to recover S from responses to challenges which are just windows of 32 bits in the middle of each Rabin ciphertext. In fact, it is entirely possible that the inventive method and scheme is secure even if the easily factorable number $n=2^256-1$ was used, and even if u=0 was used which makes the approximation of the Rabin ciphertexts quite bad. Such a choice will make the inventive authentication scheme extremely simple and fast, but will not have any formal claim of security.

The HB authentication scheme also has the overall structure of convolving two vectors (the secret S and the known challenge R) and its security is based on the difficulty of solving a large system of linear equations corrupted by noise. The method of the present invention has a novel hash function that has the overall structure of convolving a secret vector m with itself, and thus it can be viewed as a scheme whose security is based on the difficulty of solving a large number of quadratic equations. This is not entirely accurate, since the convolution is defined over the integers rather than over GF(2), and the carries are defined by expressions with degrees higher than 2. In addition, the nonlinear feedback shift register creates complex dependencies between the bits of m.

A known QUAD scheme is another attempt to construct a one way hash function which is directly based on quadratic equations over GF(2). However, the implementation complexity of QUAD is much higher than that of the present method since QUAD is based on a dense system of quadratic equations with $O(n^2)$ randomly chosen coefficients, whereas the convolution-based present invention has only O(n) coefficients defined in a very regular way in its quadratic expressions. Consequently, the method and apparatus of the present invention is much more suitable than QUAD for tiny RFID tags.

In order to compare the time complexity of the method and apparatus of the present invention with that of HB+, it is noted that both have a similar basic operation of computing the product of two bits and adding it to a register in order to compute a convolution. The main difference is that the present invention computes convolutions of vectors of length n=1277, whereas HB+ computes pairs of convolutions of vectors of length n=64. This looks faster, but is offset by the fact that the HB+ scheme adds noise to each response, and thus has to repeat the challenge-response protocol a large number of times in order to get a reliable bias which will lead to small false positive and false negative probabilities. Overall, the time complexity of the method and apparatus of the present invention is likely to be comparable to that of HB+, but it is difficult to provide definitive numbers since the original HB+ paper did not suggest concrete recommended parameters. Comparing the size of the hardware, the method of the present invention has to generate the bits it convolves by using 64-bit non-linear feedback shift registers whereas HB+ only has to store the values in 64-bit registers, which is marginally simpler. On the other hand the method and apparatus of the present invention does not need the circuitry in HB+ which generates the masking randomness and the biased noise, which can save a different type of circuit complexity. Note that both schemes can run faster when implemented on larger parallel processors and that the time complexity of method and apparatus of the present invention grows only linearly with the size of n even though the time complexity of the Rabin scheme on which it relies grows quadratically with the size of n.

Although the present invention has been shown and described in conjunction with specific embodiments, nevertheless changes and modifications will be evident to those of skill in the art that do not depart from the inventive concepts disclosed and taught herein. Such changes and modifications are deemed to fall within the purview of the appended claims.

What is claimed is:

1. A method for implementing a one-way hash function on an RFID device that comprises the step of providing computing capability to the RFID device, computing a one way hash function with security properties which accepts a k-bit message m where k is greater than 1200 bits as input, and computes as output a numeric approximation A to a small subset of $t \ll k$, where t is from 16 bits to 64 bits, out of the k bits in a Rabin ciphertext defined by $c=m^2 \pmod{n}$ where n is a k-bit composite modulus, and wherein the subset of bits in the Rabin ciphertext is a window of t consecutive bits, and wherein the numeric approximation to the t consecutive bits of c, denoted from LSB to MSB by $c_{\{i+1\}}, c_{\{i+2\}}, \ldots, c_{\{i+t\}}$, is defined by the steps of computing an extended window of t+u bits from c, denoted from LSB to MSB by $c_{\{i-u+1\}}, c_{\{i-u+2\}}, \ldots, c_{\{i\}}, c_{\{i+1\}}, \ldots c_{\{i+t\}}$, and assuming that no carry was entering into the computation of the least significant bit $c_{\{i-u+1\}}$ from lower indexed bit computations which are not carried out, the numeric approximation A consisting of the last t bits in this extended window, and the first u bits in the extended window being discarded, and outputting the number approximation A.

2. The method of claim 1, including the further step of modifying the Rabin ciphertext by a simple transformation selected from one of the addition of or the multiplication by a constant before approximating a subset of t of its k bits.

3. The method of claim 2 wherein the modulus is of the form $n=a*(2^k) \pm b$, and including the further step of multiplying the Rabin ciphertext c by a before approximating a subset of t of its k bits.

4. The method of claim 1 wherein the modulus n is of the form $a*(2^k)+b$ or $a*(2^k)-b$ where a and b are smaller than $2^k$.

5. The method of claim 4 in which $a=1$ or $b=1$ or $a=b=1$.

6. The method of claim 1 wherein the length of the window of bits is $t \geq 32$.

7. The method of claim 1 wherein the window is extended by $u \geq 16$ bits.

8. The method of claim 1 including the step of each bit $c_j$ in the extended window being computed by a convolution involving the sum of products of input bits of the form $m_v * m_{\{j-v(mod\ k)\}}$ for various values of v.

9. The method of claim 8 wherein the input bits $m_w$ are defined by a pseudo-random generator, and are recreated on the fly whenever needed rather than stored explicitly in memory.

10. The method of claim 8 wherein the number approximation A uses consecutive bytes or words rather than consecutive bits and includes convolution of the bytes or words.

11. The method of claim 1 including the steps of, when $n=2^k-1$, evaluating each bit $c_{\{j\}}$ for $(i-u+1) \leq j \leq (i+t)$ by computing a bit convolution by starting with the previously computed carry, numerically adding to it all the products $m_v * m_{\{j-v(mod\ k)\}}$ for $v=0, 1, 2, \ldots, k-1$, taking the least significant bit of the result as the computed value of $c_j$, and all the other bits as the next carry.

12. The method of claim 1 including the steps of, when $n=2^k 1$, evaluating each bit $c_{\{j\}}$ for $(i-u+1) \leq j \leq (i+t)$ by computing a bit convolution by starting with the previously computed carry, numerically adding to it all the products $m_v * m_{\{j-v(mod\ k)\}}$ for $v=0, 1, 2, \ldots, k-1$, taking the least significant bit of the result as the computed value of $c_j$, and all the other bits as the next carry, except that products $m_v * m_{\{j-v(mod\ k)\}}$ in which j−v is negative are subtracted from rather than added to the other values.

13. The method of claim 1 including the steps of, when $n=a*2^k \pm b$, evaluating each bit $c_{\{j\}}$ for $(i-u+1) \leq j \leq (i+t)$ by computing a bit convolution by starting with the previously computed carry, numerically adding to it all the products $m_v * m_{\{j-v(mod\ k)\}}$ for $v=0, 1, 2, \ldots, k-1$, taking the least significant bit of the result as the computed value of $c_j$, and all the other bits as the next carry, except that products $m_v * m_{\{j-v(mod\ k)\}}$ in which j−v is negative are multiplied by a before being added to or subtracted from the result, and products $m_v * m_{\{j-v(mod\ k)\}}$ in which j−v is nonnegative are multiplied by b before being added to the result.

14. A method for authenticating a device D to a reader E which share secret information S by an interactive challenge-response protocol comprising the steps of:
   a. receiving by D of a random challenge R sent from E;
   b. combining by D of the secret S and the challenge R by a MIX function which produces a k-bit value m=MIX(S, R);
   c. calculating a number approximation A of m according to claim 1, and sending A from D to E; and
   d. verifying the number approximation A of m by E recomputing the value A, and accepting the proof of authenticity only if the computed and received values of A are the same.

15. The method of claim 14, wherein the MIX function of step b is carried out by first combining R and S by a simple function of one of XOR'ing, adding and concatenating them, and then extending the result to k bits by using a simple reversible pseudo-random bit generator of one of a nonlinear feedback shift register and a Feistel structure seeded with the combined value.

16. A non-transitory computer readable medium for an RFID device D having a processor and being part of a secure communication system comprised of the device D and a reader E, said medium containing non-transient executable instructions that program the processor contained in the device D for authenticating the device D to a reader E, which share secret information S, by an interactive challenge-response protocol, the non-transient executable instructions program the device D for:
   a. receiving by D of a random challenge R sent from E;
   b. combining by D of the secret S and the challenge R by a MIX function which produces a k-bit value m=MIX(S, R);
   c. calculating a number approximation A of m according to claim 1, and sending the result A from D to E;
   d. wherein E verifies the number approximation A of m by recomputing the value A, and accepts the proof of authenticity only if the computed and received values are the same.

17. Apparatus for authenticating an RFID device D to a reader E which share secret information S by an interactive challenge-response protocol, said device D containing a processor and circuitry to:
   a. receive by D a random challenge R sent from E;
   b. combine by D the secret S and the challenge R by a MIX function which produces a k-bit value m=MIX(S,R);
   c. calculate a number approximation A of m by computing a one way hash function with security properties which accepts a k-bit message m where k is greater than 1200 bits as input, and computes as output a numeric approximation A to a subset of $t \ll k$, where t is from 16 bits to 64 bits, out of the k bits in a Rabin ciphertext defined by $c=m^2 \pmod{n}$ where n is a k-bit composite modulus, and wherein the subset of bits in the Rabin ciphertext is a window of t consecutive bits, and wherein the numeric approximation to the t consecutive bits of c, denoted from LSB to MSB by $c_{\{i+1\}}, c_{\{i+2\}}, \ldots, c_{\{i+t\}}$, is defined by the steps of computing an extended window of t+u bits from c, denoted from LSB to MSB by $c_{\{i-u+1\}}, c_{\{i-u+2\}}, \ldots, c_{\{i\}}, c_{\{i+1\}}, \ldots c_{\{i+t\}}$, and assuming that no carry was entering into the computation of the least significant bit $c_{\{i-u+1\}}$ from lower indexed bit computations which are not carried out, the numeric approximation A consisting of the last t bits in this extended window, and the first u bits in the extended window being discarded, and outputting the number approximation A and sending to E;

whereby E can verify the number approximation A of m by recomputing the value A, and accept the proof of authenticity only if the computed and received values of A are the same.

\* \* \* \* \*